(12) United States Patent
Chen et al.

(10) Patent No.: US 8,560,943 B2
(45) Date of Patent: Oct. 15, 2013

(54) DISPLAYING DOCUMENTS ON MOBILE DEVICES

(75) Inventors: Rebecca L J Chen, Taipei (TW); Rick M F Wu, Taipei (TW); Cecelia Y C Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 12/728,410

(22) Filed: Mar. 22, 2010

(65) Prior Publication Data

US 2010/0251102 A1 Sep. 30, 2010

(30) Foreign Application Priority Data

Mar. 31, 2009 (TW) .................. 98110704 A

(51) Int. Cl.
*G06F 17/24* (2006.01)
*G06F 17/25* (2006.01)

(52) U.S. Cl.
USPC .......................................... 715/243; 715/717

(58) Field of Classification Search
USPC ........................................................ 715/243
See application file for complete search history.

(56) References Cited

U.S. PATENT DOCUMENTS

| | | | |
|---|---|---|---|
| 5,608,850 A * | 3/1997 | Robertson ..................... | 345/427 |
| 5,797,139 A | 8/1998 | Amro | |
| 6,489,968 B1 | 12/2002 | Ortega et al. | |
| 7,149,680 B2 * | 12/2006 | Storisteanu et al. .............. | 704/1 |
| 7,644,361 B2 * | 1/2010 | Wu et al. ........................ | 715/273 |
| 2006/0014523 A1 * | 1/2006 | Reilly ......................... | 455/412.1 |
| 2006/0288015 A1 * | 12/2006 | Schirripa et al. .............. | 707/100 |
| 2007/0264983 A1 * | 11/2007 | Chen et al. .................. | 455/414.1 |
| 2007/0282945 A1 * | 12/2007 | Bisht ............................. | 709/203 |
| 2008/0235585 A1 * | 9/2008 | Hart et al. ...................... | 715/717 |
| 2010/0312766 A1 * | 12/2010 | Horn .............................. | 707/737 |
| 2011/0122085 A1 * | 5/2011 | Chang ............................ | 345/174 |
| 2012/0102395 A1 * | 4/2012 | Cho et al. ...................... | 715/253 |

FOREIGN PATENT DOCUMENTS

| | | |
|---|---|---|
| TW | 200539016 A | 12/2005 |
| TW | 200622932 A | 7/2006 |
| TW | 200905499 A | 2/2009 |

OTHER PUBLICATIONS

Chiu et al., "Content Based Automatic Zooming Viewing Documents on Small Displays", ACM, 2008, pp. 817-820.*

* cited by examiner

*Primary Examiner* — James Debrow
(74) *Attorney, Agent, or Firm* — Holland & Knight LLP; Brian J. Colandreo, Esq.; Jeffrey T. Placker, Esq.

(57) ABSTRACT

Displaying a document on an information handling system (e.g., a mobile device) having a display unit and an input unit. In one embodiment, this may comprise: analyzing the document to determine a group of selected objects to be displayed on the display unit; generating object views respectively corresponding to the selected objects; and displaying the object views on the display unit by manipulating the input unit.

13 Claims, 16 Drawing Sheets

Fats

Fats can be classified as two: animal fats and plant fats.

Fats are a high energy source. One gram of fats contains 9 kcal. Fats carry the fat-soluble vitamins (i.e., vitamins A, D, E, and K).

Plant fats mainly come from bean oil, peanut oil, etc.

Animal fats mainly come from lard, butter, fish oil, etc.

| | carbo-hydrate | protein | fat |
|---|---|---|---|
| energy per gram | 4 kcal/g (4000 cal/g) | 4 kcal/g (4000 cal/g) | 9 kcal/g (4000 cal/g) |

FIG. 6

| | Cut |  |
|---|---|---|
| | Copy | |
| | Paste | |
| | View Group | ☐ Jump |
| | Pattern | |

DISPLAYING DOCUMENTS ON MOBILE DEVICES

RELATED APPLICATIONS

The subject application claims the priority of Taiwanese Patent Application No.: 98110704, filed on 31 Mar. 2009, the contents of which are herein incorporated by reference in their entirety.

BACKGROUND OF THE INVENTION

1. Field of the Invention

The present disclosure relates generally to displaying document data on a display, and more particularly, to displaying document data on mobile devices.

2. Description of the Related Art

Mobile devices, such as PDAs (Personal Digital Assistants), mobile phones, navigating devices, and so on, in recent years are fast developing and can work as computer terminals. The mobile devices are usually light-weight and have small-sized display units and input units.

Although mobile devices are easy to carry, the limited screen sizes of the display units are not suitable for the users to view the contents displayed on the display units. For example, when the users of the mobile devices are viewing the contents of World Wide Web (WWW, web pages formatted according to the Hypertext Markup Language (HTML)) documents, presentation documents, or other documents, which are normally designed for portrayal on a desktop-sized monitor, this may result in trouble in viewing these documents as the dimensions are often remarkably larger than the display dimensions of the mobile devices One solution to the above situation may be to view the documents by horizontal and vertical scrolling with scroll bars, and it can provide a page scroll function for the user to enable navigation on the document to a desired position. However, the display size of the desktop-sized monitor may be far larger than that of the mobile device, so this solution may be generally experienced as uncomfortable or even annoying for the user.

Another solution is to re-author the document into one or more mobile-friendly format, wherein the original document, designed to be displayed on a desktop-sized monitor, is transformed through a series of transformations, along with characteristics of the mobile device, so that the document can be appropriately displayed on the mobile device. However, this approach requires additional processing/transformation/maintenance and may results in incorrect displaying.

Thus, a better way of displaying/viewing documents on mobile devices may assist in improving the document viewing experience.

SUMMARY OF THE INVENTION

In one aspect, one embodiment of the present disclosure may provide a method for displaying a document on an information handling system having a display unit and an input unit. The method may comprise: analyzing the document to determine a group of selected objects to be displayed on the display unit; generating object views respectively corresponding to the selected objects; and displaying the object views on the display unit by manipulating the input unit.

In another aspect, one embodiment of the present disclosure may provide an information handling system, the information handling system having a display unit and an input unit, for displaying a document on the display unit. The information handling system may comprise: an analysis module for analyzing the document to determine a group of selected objects to be displayed on the display unit; a view generation module for generating object views respectively corresponding to the selected objects; and a manipulation module for manipulating the object views displayed on the display unit.

Still another aspect, one embodiment of the present disclosure may provide a computer program product for displaying a document on an information handling system having a display unit and an input unit. The computer program product may comprise stored code for: analyzing the document to determine a group of selected objects to be displayed on the display unit; generating object views respectively corresponding to the selected objects; and displaying the object views on the display unit by manipulating the input unit.

Furthermore, the described features, advantages, and characteristics of the invention may be combined in any suitable manner in one or more embodiments. One skilled in the relevant art may recognize that the embodiments of the present disclosure may be practiced without one or more of the specific features of a particular embodiment. In other instances, additional features may be recognized in certain embodiments that may not be present in all embodiments of the invention.

BRIEF DESCRIPTION OF THE DRAWINGS

In order that the invention will be readily understood, a more particular description of the disclosure briefly described above will be rendered by reference to specific embodiments that are illustrated in the appended drawings. Understanding that these drawings depict only typical embodiments of the invention and are not therefore to be considered to be limiting of its scope, the disclosure will be described and explained with additional specificity and detail through the use of the accompanying drawings:

FIG. 6 shows in a screenshot an example of a document according one embodiment of the present disclosure.

DETAILED DESCRIPTION OF THE PREFERRED EMBODIMENTS

Figure 1:
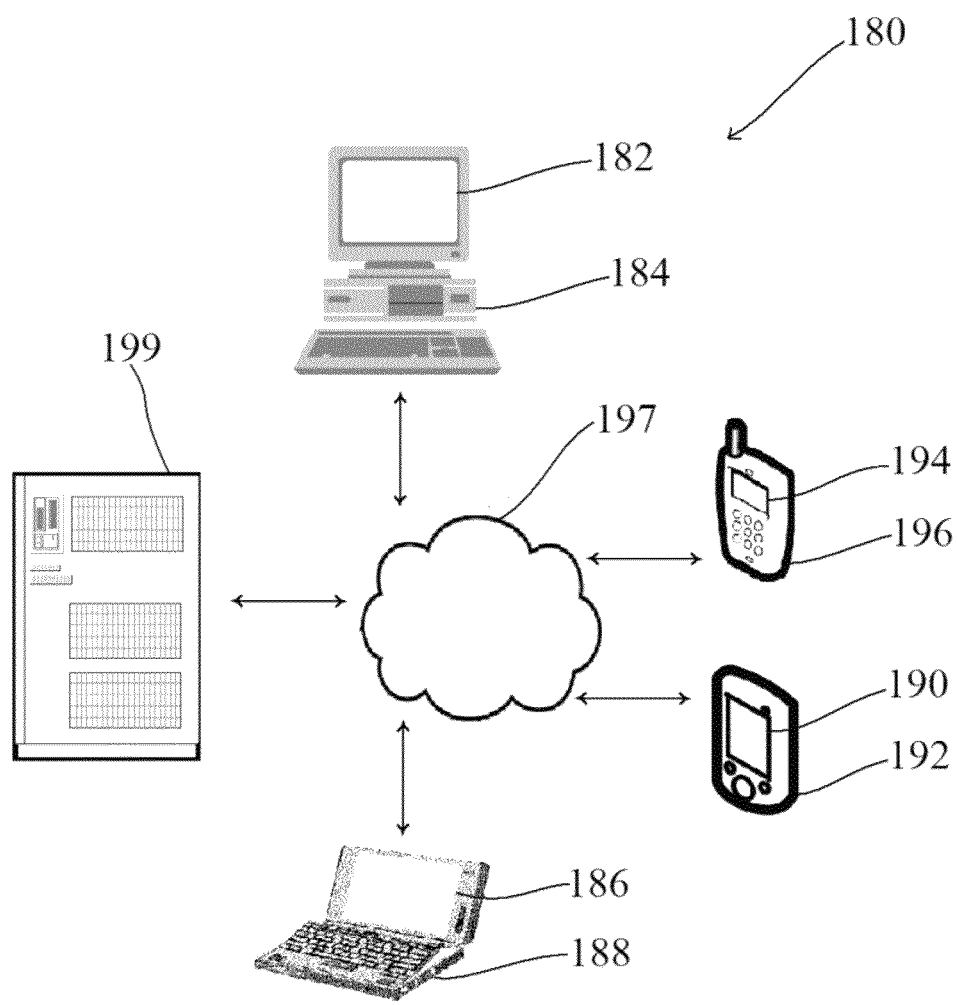
FIG. 1 is an exemplary diagram of a network environment according to an embodiment of the present disclosure.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

As will be appreciated by one skilled in the art, the present disclosure may be embodied as a system, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "circuit," "module", or "system." Furthermore, the present disclosure may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java®, Smalltalk, C++ or the like and conventional procedural programming languages, such as the "C" programming language or similar programming languages. ("Java" is a registered trademark of Sun Microsystems, Inc. in the United States, other countries, or both.) The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 16, devices, methods, and computer program products are illustrated as structural or functional block diagrams or process flowcharts according to various embodiments of the present disclosure. The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an exemplary diagram of a network environment 180 according to an embodiment of the present disclosure. In this exemplary embodiment, the network environment 180 comprises a first information handling system 184 having a first display unit 182, a second information handling system 188 having a second display unit 186, a third information handling system 192 having a third display unit 190, a fourth information handling system 196 having a fourth display unit 194, and a fifth information handling system 199. The first information handling system device 184 and the second information handling system device 186 may include, but are not limited to, a personal computer, such as a computer with a notebook-sized display unit (monitor), a computer with a desktop-sized display unit (monitor), and so on. The third information handling system 192 and the fourth information handling system 196 may include, but are not limited to, an information handling system with a small-sized display unit, such as mobile devices, including but not limited to cell phones, smart phones, PDAs, and so on. In this embodiment, the first information handling system device 184 may be a desktop computer and the second information handling system device 186 may be a notebook computer; the third information handling system 192 may be a PDA and the fourth information handling system 196 may be a mobile phone. The fifth information handling system 199 may include, but is not limited to, a server. All information handling systems 184, 188, 192, 196 and 199 may use conventional wire/wireless communication networks for connection and transmission. The connection and transmission can be implemented by any hardware architectures and software protocols. For example, the internet and PCP/IP protocols may be used for connection and transmission, wireless technologies such as GSM/GPRS, 3G, and Wimax may be used for connection and transmission, and other connection/transmission technologies may also be implemented without departing from the scope and spirit of the disclosure. In the embodiment, a web page server, a database server, or any other server may be implemented as the server 199 without departing from the scope and spirit of the present disclosure. One skilled in the art should recognize that the types of services provided by the server 199 are not limited. One skilled in the art should recognize that the number of the information handling systems 184, 188, 192, 196 and 199 are not limited. The following embodiments are given to enable those skilled in the art to more clearly understand and to practice the present disclosure. They should not be considered as limiting the scope of the disclosure, but merely as being illustrative and representative thereof.

Figure 2:
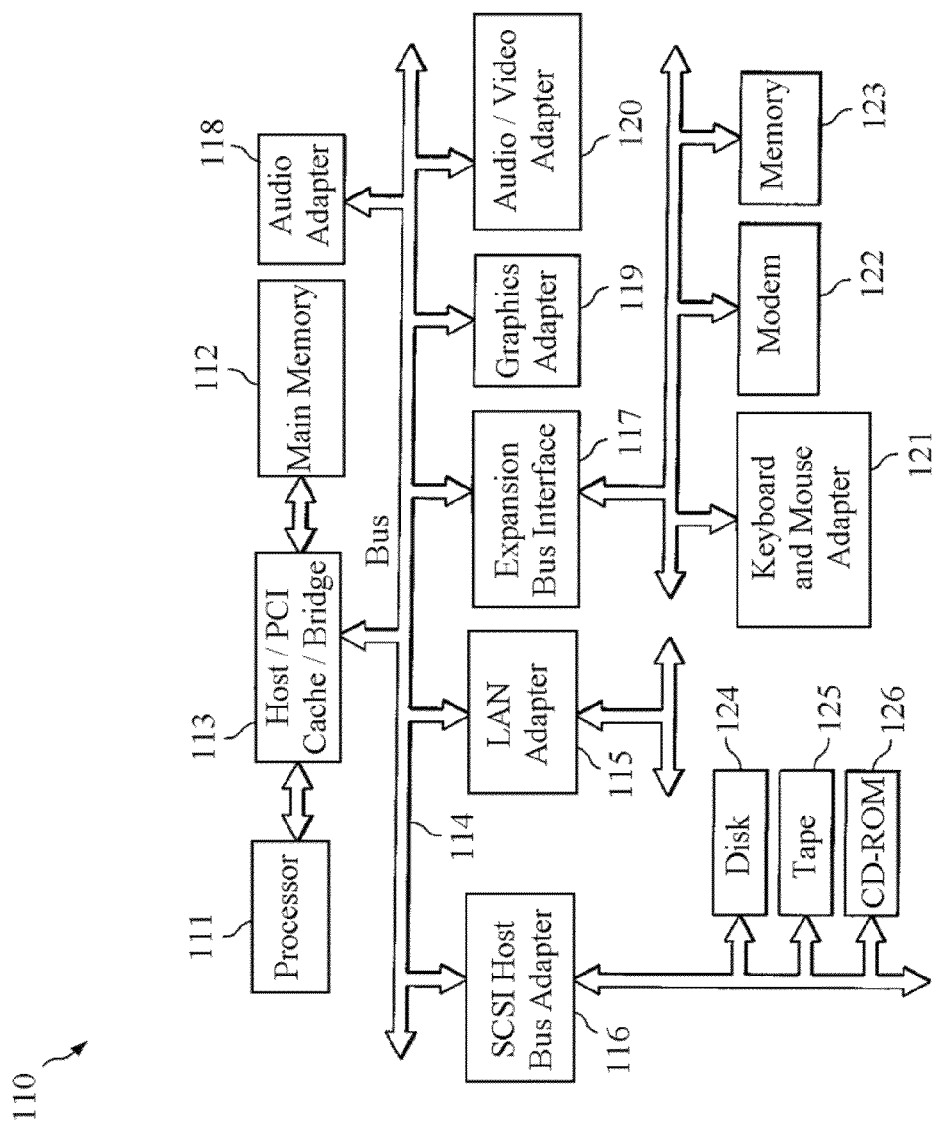
FIG. 2 is an exemplary diagram of one information handling system according to an embodiment of the present disclosure.

FIG. 2 is an exemplary diagram of the information handling system 110 (for example, the first information handling system 184, the second information handling system 188, the third information handling system 192, the forth information handling system 196, or the fifth information handling system 199, or the like) according to an embodiment of the present disclosure. In this example, the information handling system 110 is a general-purpose computer, in which code or instructions implementing processes of the present disclosure may be located. The information handling system 110 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 111 and main memory 112 may be connected to PCI local bus 114 through PCI bridge 113. PCI bridge 113 also may include an integrated memory controller and cache memory for processor 111. Additional connections to PCI local bus 113 may be made through direct component interconnection or through add-in boards.

In the depicted example, local area network (LAN) adapter 115, small computer system interface (SCSI) host bus adapter 116, and expansion bus interface 117 are connected to PCI local bus 114 by direct component connection. In contrast, audio adapter 118, graphics adapter 119, and audio/video adapter 120 may be connected to PCI local bus 114 by add-in boards inserted into expansion slots. Expansion bus interface 117 may provide a connection for a keyboard and mouse adapter 121, modem 122, and additional memory 123. SCSI host bus adapter 116 may provide a connection for hard disk drive 124, tape drive 125, and CD-ROM drive 130. Typical PCI local bus implementations may support three or four PCI expansion slots or add-in connectors.

Those of ordinary skill in the art may appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present disclosure may be applied to a multiprocessor data processing system. For example, the first information handling system 184, if optionally configured as a network computer, may omit SCSI host bus adapter 116, hard disk drive 124, tape drive 125, and CD-ROM 126. In that case, the computer, to be properly called a client computer, includes some type of network communication interface, such as LAN adapter 115, modem 122, or the like. As another example, the first electronic devices 184 may be a stand-alone system configured to be bootable without relying on some type of network communication interface, whether or not the first electronic devices 184 comprises some type of network communication interface. As a further example, the first electronic devices 184 may be a personal digital assistant (PDA), which may be configured with ROM and/or flash ROM to provide non-volatile memory for storing operating system files and/or user-generated data. The depicted example in FIG. 2 and above-described examples are not meant to imply architectural limitations.

Figure 3:
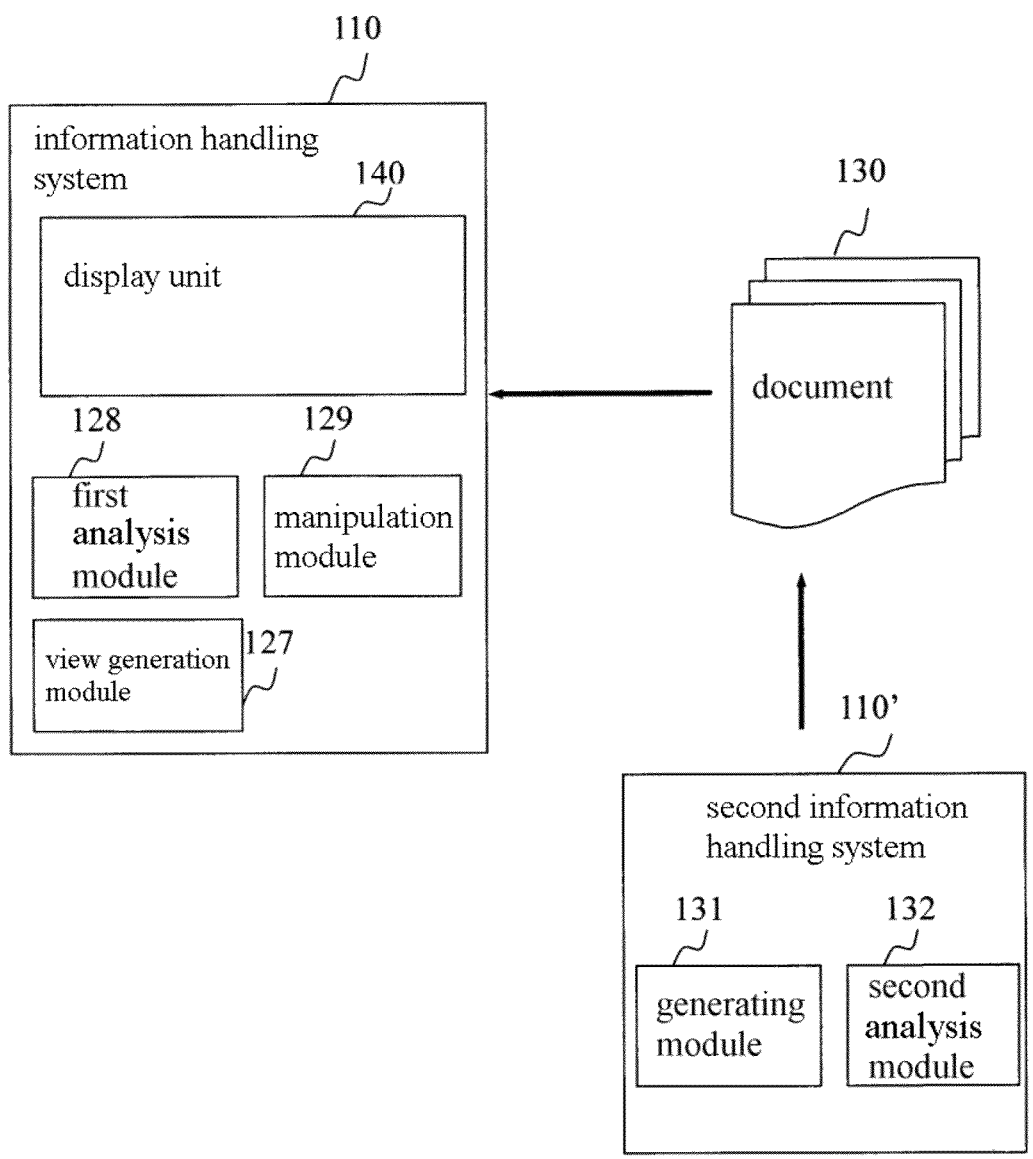
FIG. 3 illustrates a block diagram of one information handling system for processing a document and displaying the document according to an embodiment of the present disclosure.

FIG. 3 illustrates a block diagram of an information handling system 110' for processing a document 130 and an information handling system 110 for displaying the document 130 on the screen of the display unit 140 according to one embodiment of the present invention. Please also refer to FIG. 2, an operating system runs on processor 111 and is used to coordinate and provide control of various components within the information handling system 110. The operating system may be a commercially available operating system such as Windows XP®. An object oriented programming system such as Java® may run in conjunction with the operating system and provides calls to the operating system from Java® programs or applications executing on the information handling system 110. Instructions for the operating system, the object-oriented programming system, and applications or programs are located on storage devices, such as hard disk drive 124, and may be loaded into main memory 112 for execution by processor 111.

The term "screen" refers to any visual element or combinations of visual elements for displaying information or forms; examples include, but are not limited to, user interfaces on a display device or information displayed in web pages on a display device. The screens may be formatted, for example, as WebPages in HyperText Markup Language (HTML), Extensible Markup Language (XML) or in any other suitable form for presentation on a display device depending upon applications used by users to interact with the system. It should be noted that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The document 130 may be configured to be displayed on the display unit 140 of the information handling system 110. The constitution and operations of the information handling system 110 are basically the same as the constitution and operations of conventional mobile devices, including but not limited to cell phones, smart phones, and PDAs, and so on. FIG. 2 is a block diagram showing the main functional constitution of the information handling system 110. In this embodiment, the information handling system 110 may comprise a view generation module 127, a first analysis module 128, and a manipulation module 129. The information handling system 110 may receive the document 130. The view generation module 127 may be capable of generating a view of the document 130 in response to a request to view the document 130 on the display unit 140 of the information handling system 110. The first analysis module 128 may be capable of analyzing the received document 130 to extract one or more objects or components from the received document 130 and to determine a group of selected objects to be displayed on the display unit 140 by a selection operation. The group of selected objects may be passed to the view generation module 127 for a later display on the display unit 140. The manipulation module 129 may be capable of manipulating the group of selected objects in response to a user manipulation, such as displaying the selected objects in a specific sequence; jumping between the selected objects; zoom in the selected object, zoom out the selected object; rotate the selected object clockwisely; rotate the selected object counterclockwisely; flip the selected object; display the selected object in a most appropriate manner (for example, in a fit-to-screen display manner); and so on. The manipulation module 129 may be implemented as a series of functions that can be invoked by the view generation module 127 based on a chosen manipulation. On a typical mobile device, manipulation may be implemented using the available hardware keys, hardware buttons, track wheel, a 4-way navigator device, or a touch screen. This may allow for convenient and rapid manipulation throughout the selected objects. The selection operation may occur, for example, by entering a series of keystrokes or in other ways such as through voice commands or use of a touch screen, or by using a cursor-control device (i.e., a mouse) to "click on" or "double-click on" a specific object. In this embodiment, a document display software may be used to provide a function of displaying the document 130 on the display unit 140, such as a presentation software, including but not limited to Microsoft PowerPoint® ("PowerPoint" is a registered trademark of Microsoft Corporation in the United States, other countries, or both), IBM Freelance® ("Freelance" is a registered trademark of International Business Machines Corporation in the United States, other countries, or both), and so on; a Web (World Wide Web) browser, including but not limited to Microsoft's Internet Explorer® ("Internet Explorer" is a registered trademark of Microsoft Corporation in the United States, other countries, or both), and so on. The document 130 may be a webpage, a presentation file, including but not limited to PPT file, PRZ file, and so on; various document, including but not limited to WORD® file ("Word" is a registered trademark of Microsoft Corporation in the United States, other countries, or both), ODF (Open Document Format) file including ODP file (presentation), ODT file (word processing), ODS file (spreadsheet), and so on. The modules that are realized by executing application programs in the manner described above may be understood as tasks (or processes). In other words, the view generation module, the first analysis module, the manipulation module, the second analysis module, and the grouping module may be understood respectively as a view generation task, a first analysis task, a manipulation task, a second analysis task, and a grouping task that are executed in the information handling system 110/the second information handling system 110'. Hereinafter, "task" will be described consistently as "module" as long as there is no need to differentiate therebetween. Details of the view generation task, the analysis task, the manipulation task, and the display task will be described later.

FIG. 3 also discloses a second information handling system 110' to generate the document 130 according to an embodiment of the present invention. The document 130 may be configured to be displayed on the display unit 140 of the information handling system 110. The constitution and operations of the second information handling system 110' are basically the same as the constitution and operations of conventional information handling systems, including but not limited to cell phones, smart phones, PDAs, desktop-sized computers, notebook-sized computers, and so on. In this embodiment, the second information handling system 110' comprises a second analysis module 131 and a grouping module 132. The document 130 may be created by a document author using the second information handling system 110'. The second analysis module 131 is capable of analyzing the generated document 130 to extract one or more objects or components from the generated document 130 and to determine a group of selected objects to be displayed on the display unit 140 by a selection operation. The grouping module 132 may be capable of forming a group of selected objects to be displayed on the display unit 140 of the information handling system 110 later and the display sequence of the group of selected objects. Details of the analysis task and the grouping task will be described later.

In addition to the various modules described above, the information handling system 110/the second information handling system 110' may also comprise image processing modules (image decompression module, size conversion module, noise removing module, and so on) such as those provided in a typical information handling system 110.

The various modules in the information handling system 110/the second information handling system 110' may be functionally realized by having the CPU 111 execute application programs stored in the main memory 112. These application programs are preferably constituted such that they can be installed or loaded in the information handling system 110/the second information handling system 110' through various types of recording medium such as hard disk drive 124, tape drive 125, and CD-ROM drive 130, for example, or via a communication network. Further, the CPU 111 preferably executes the programs for realizing the various means on a real time multitask OS.

Figure 4:
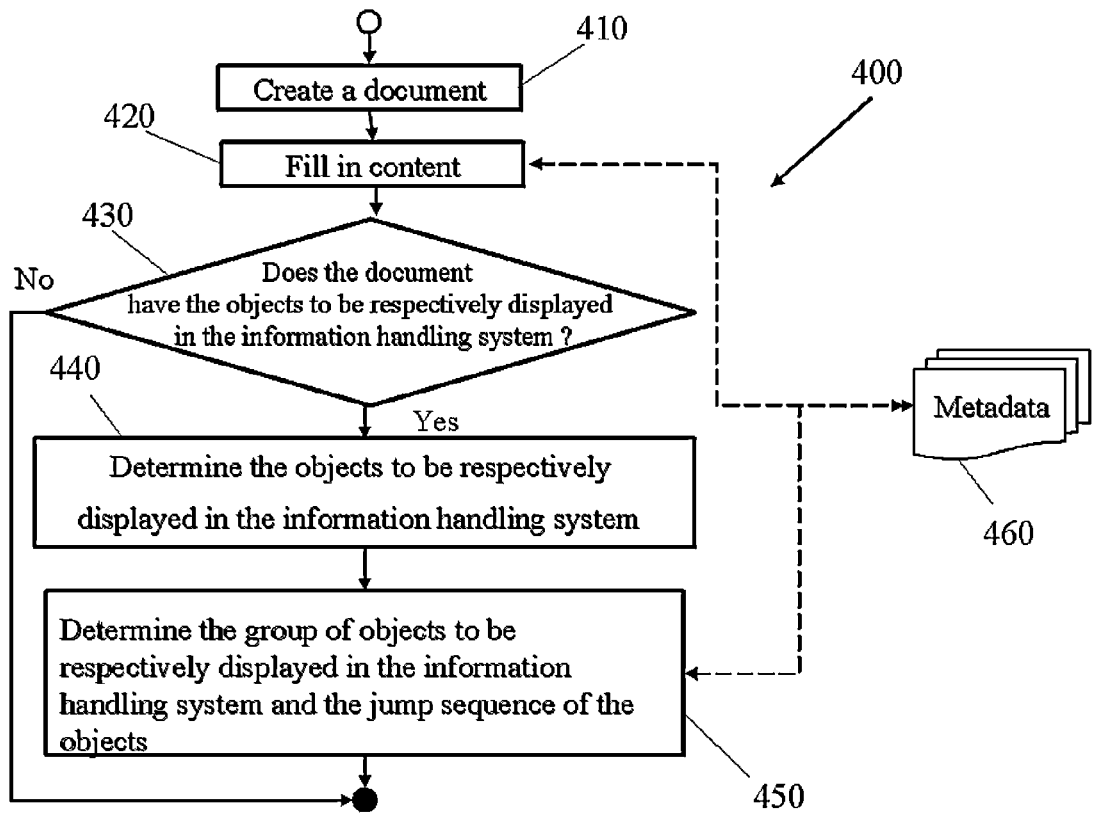
FIG. 4 is a flowchart illustrating the method according to one embodiment of the present disclosure.
Figure 5:
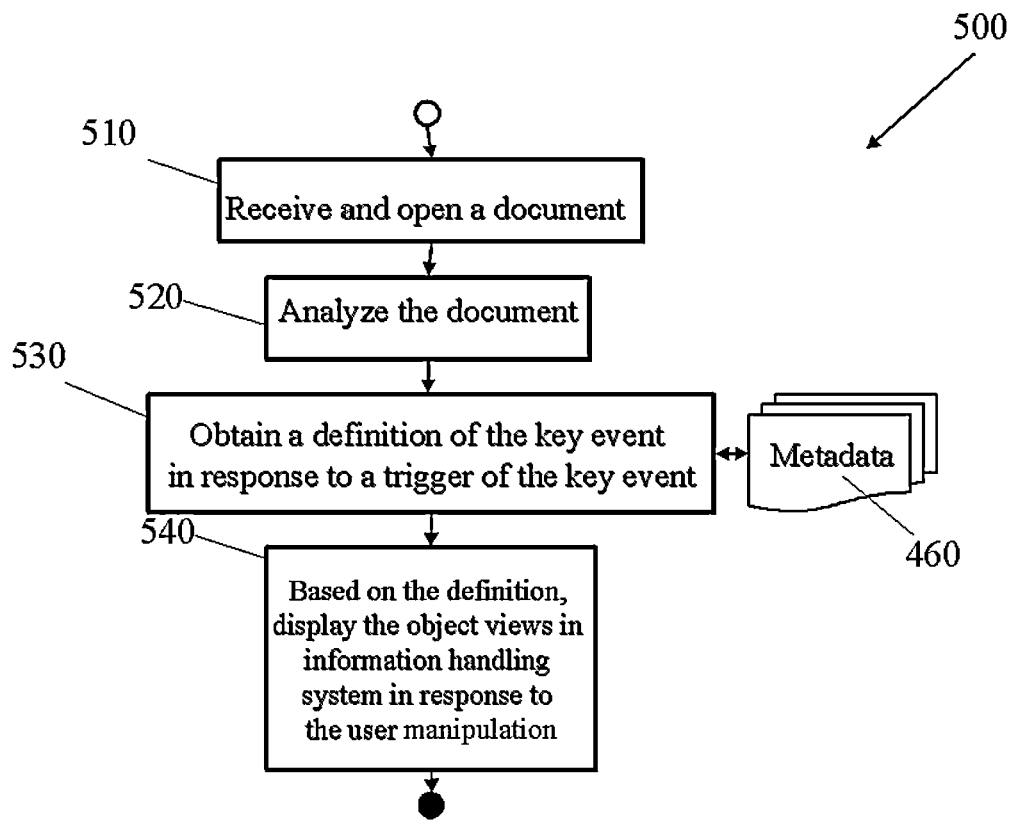
FIG. 5 is a flowchart illustrating the method according to one embodiment of the present disclosure.

Please refer to FIG. 4 and to FIG. 5 for flowcharts illustrating the methods in the information handling system 110 and the second information handling system 110' according to one embodiment of the present disclosure. The operations of each task will now be described with reference to the flowchart shown in FIG. 4 and to FIG. 5.

FIG. 4 is a flowchart illustrating the method 400 performed in the second information handling system 110' according to one embodiment of the present invention. The method 400 begins at step 410, wherein an author creates the document 130. At step 420, the author fills in content to the document 130 so that there are plural objects (such as text objects, table objects, image objects, animation objects, video objects, and so on) in the document 130. After the content is filled in the document 130, the second analysis module 131 determines whether the document 130 has the objects to be respectively displayed in the information handling system 110 based on the judgment of the author or an automatic judging means (step 430), and the automatic judging means may be constituted similarly to a conventional automatic judging means provided in a conventional information handling system. At step 440, if the document 130 has the objects to be respectively displayed in the information handling system 110, the objects to be displayed in the information handling system 110 may be determined as a view group based on the judgment of the author or an automatic judging means, and the automatic judging means may be constituted similarly to a conventional automatic judging means provided in a conventional information handling system. Then, the grouping module 132 may determine the group of the objects to be respectively displayed in the information handling system 110 and the jump sequence of the objects (step 450). All the related data of the steps may be located on the metadata 460 of the document 130 or a specific area of the document 130. The criteria of the objects to be respectively displayed in the information handling system 110 may depend on different situations or requirements. For example, the object with a relatively large amount of data (such as a relatively large amount of text data) may be determined as the object to be respectively displayed in the information handling system 110. For example, the object with a relatively large font size may be determined as the object not to be respectively displayed in the information handling system 110. In other words, in this embodiment, whether the object is to be respectively displayed in the information handling system 110 is determined by the judgment of the author or an automatic judging means, and the automatic judging means may be constituted similarly to a conventional automatic judging means provided in a conventional information handling system. The logics in FIG. 4 can generate the above functions and interfaces, and the user can be guided to achieve the above modules and tasks through a serial of steps.

FIG. 5 is a flowchart illustrating the method 500 performed in the information handling system 110 according to one embodiment of the present invention. The method 500 begins at step 510, wherein the document 130 is received by the information handling system 110 and then opened. The document 130 is displayed in a full document view (but with smaller images/tables/texts) on the display unit 140. The document 130 described, for example, in HTML or the like from the second information handling system 110' through a communication network, and stores the document 130 in a reception buffer of the information handling system 110 so that the document 130 may be opened in the later process. The first analysis module 128 reads the document 130, analyzing the document structure of the document 130, and extracting the objects (such as text objects, table objects, image objects, animation objects, video objects, and so on) included in the document (Step 520). The first analysis module 128 may be constituted similarly to a conventional analysis task provided in a conventional the information handling system. At step 530, the user obtains the key event definition in response to a trigger of a key event from the metadata 460, such as the objects in the group of the selected object to be respectively displayed in the information handling system 110, the display sequence of the objects in the group of the selected object to be respectively displayed in the information handling system 110, and so on. The key event may be a hard key event, a soft key event, or a combination of a hard key event and a soft key event. The key event may be a set of keys making various manipulations on the objects in the group of the selected objects to be respectively displayed in the information handling system 110. For example, in the document 130 shown on the display unit 140, highlighting the objects as the ones in the group of the selected objects to be respectively displayed in the information handling system 110; jumping between the objects in the group of the selected objects to be respectively displayed in the information handling system 110; zooming in the selected object, zooming out the selected object; rotating the selected object clockwisely; rotating the selected object counterclockwisely; flipping the selected object; displaying the selected object in a most appropriate manner (for example, in a fit-to-screen display manner); and so on. At step 540, based on the key event definition, in response to the user manipulation, display the objects views on the display unit 140.

FIG. 6 shows in a screenshot an example of a document according one embodiment of the present disclosure. A document author creates a document 600, for example, an ODP file or a PPT file. The ODP file (or PPT file) may comprise a plurality of objects, such as text objects, image objects, table objects, animation objects, video objects, and so on. Under the situation of a large-sized display unit, the full document view of the document 600 may be satisfactory and suitable for viewing by peoples. However, under the situation of the small-sized display unit, such as mobile devices (including but not limited to PDAs, mobile phones, navigating devices, and so on), it's hard to view the objects in the document 600 on the display unit. Especially for the objects with smaller sizes, the viewing may be more difficult. Taking FIG. 6 for example, viewing the document 600 on a mobile phone, it may be hard to clearly read the text objects with smaller fonts or the table objects with lots of characters.

Figures 7A, 7B:
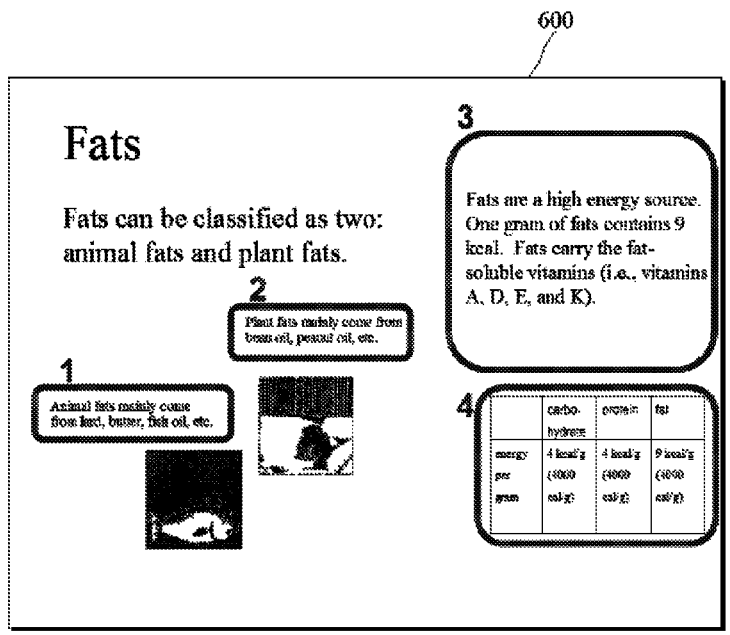
FIG. 7A and FIG. 7B shows in a screenshot an example of a document according one embodiment of the present disclosure, wherein a group of selected objects are explained.

FIG. 7 shows in a screenshot an example of a document according one embodiment of the present invention, wherein a group of selected objects are explained. Firstly, the document author creates the document 600. The document 600 may comprise a plurality of objects, such as text objects, image objects, animation objects, video objects, and so on. The document author can determine a group of specific objects to be respectively manipulated/displayed according to the actual needs. As shown in FIG. 7A, when creating the document, the document author select object 1, object 2, object 3, and object 4 as the objects to be respectively manipulated/displayed on the display unit and defines these objects as a group of selected objects to be respectively manipulated/displayed on the display unit. At the same time, the document author determines the display sequence of these objects to be object 1, objects 2, objects 3, and object 4. FIG. 7B shows one illustrative embodiment to achieve the functions explained in FIG. 7A. The functions in FIG. 7A may be, for example, achieved by a pull-down list shown in FIG. 7B. In addition to the traditional options of Cut, Copy, Paste, and so on, there is a "View Group" option. The document author can decide an object to be in the group of selected objects to be respectively manipulated/displayed on the display unit by a right click on the object. There may also be a Jump (between the objects) option, the document creator may jump between the selected objects by a click on the jump option.

When the document 600 is to be used by the information handling system 110, the document 600 is processed by a separation process, no matter what the document 600 is obtained from a second information handling system 110' or from a server side. The separation task may separates a plurality of objects from the document, such as text objects, image objects, table objects, animation objects, video object, javalets, and so on. The separation task may be constituted similarly to a conventional separation task provided in the document. After the separation process, the objects are then analyzed and grouped.

Figure 8:
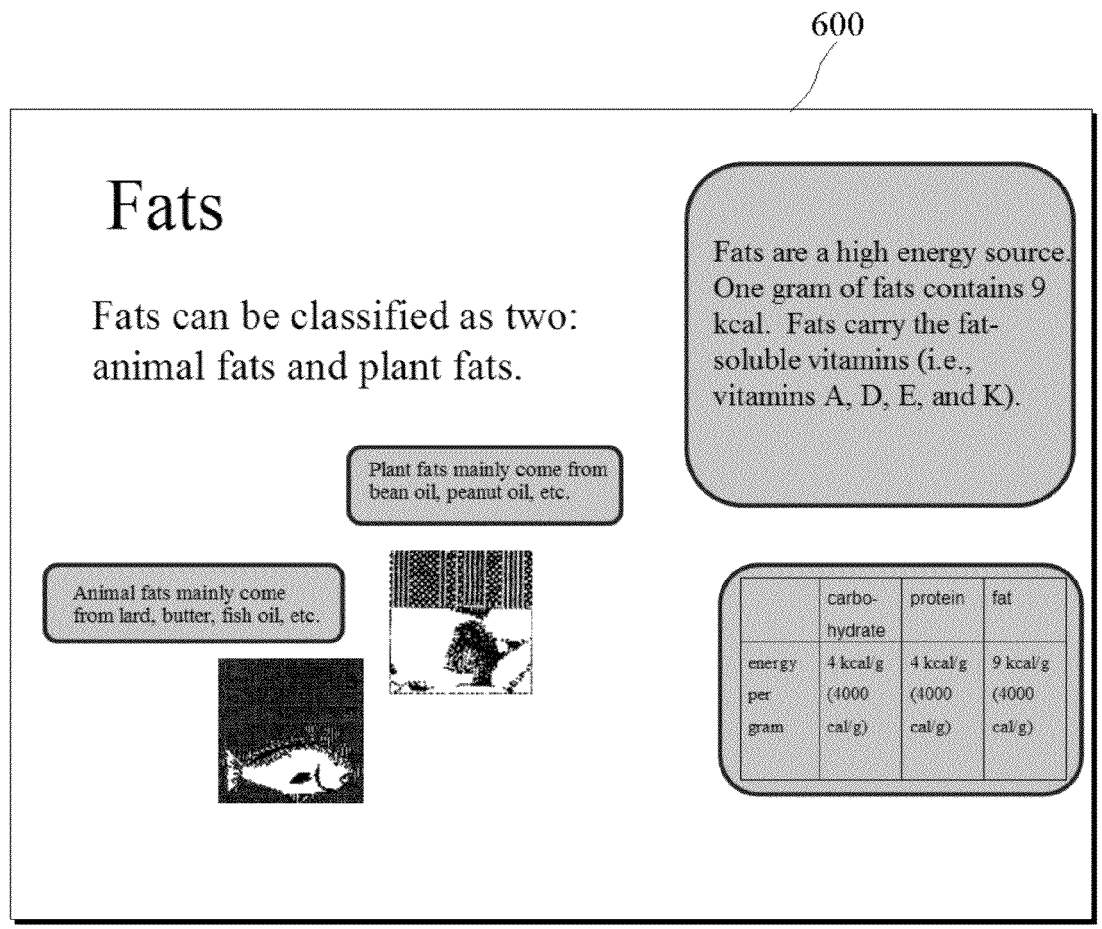
FIG. 8 shows in a screenshot an example of a document according one embodiment of the present disclosure, wherein a highlight operation is explained.

Please refer to FIGS. 7A and 7B; according to one illustrative embodiment, the document creator determines object 1, object 2, object 3, and object 4 as the objects in the group of the selected objects to be respectively manipulated/displayed on the display unit. The determined jump sequence is object 1, object 2, object 3, and object 4. FIG. 8 shows in a screenshot an example of a document according one embodiment of the present disclosure, wherein a highlight operation is explained. After the document 600 is opened by the user of the information handling system 110, a highlight operation can be performed on the group of the selected objects to be respectively manipulated/displayed on the display unit. For example, the user can trigger a key event (such as a hardkey event "alt-h" to highlight the selected objects in the group (i.e., object 1, objects 2, object 3, and object 4).

Figure 9:
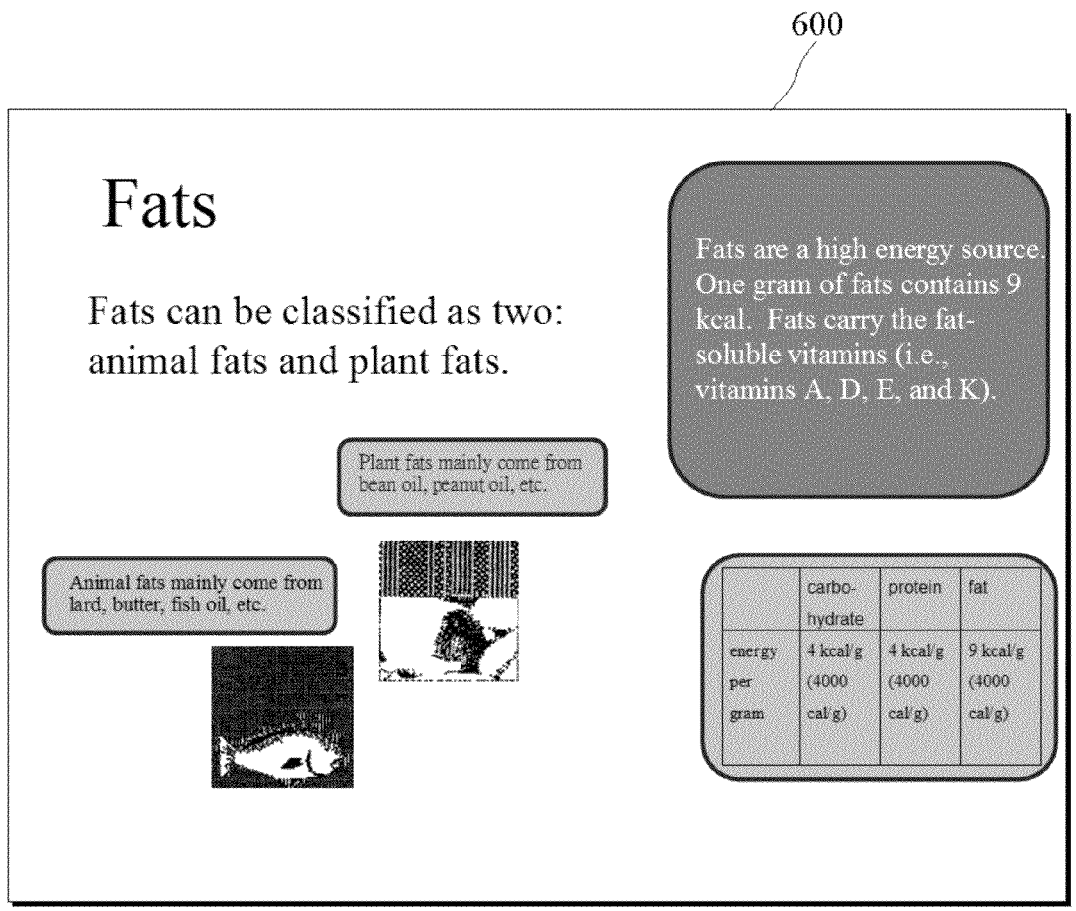
FIG. 9 shows in a screenshot an example of a document according one embodiment of the present disclosure, wherein a select operation is explained.

FIG. 9 shows in a screenshot an example of a document according one embodiment of the present disclosure, wherein a jump operation is explained. The user may repeatedly trigger a key event (such as the key event "alt-j"). According to the previously defined display sequence of the objects, the user of the information handling system may have a jump operation on the highlighted objects. The jump sequence may be object 1, object 2, object 3, and object 4, and the jump sequence may be repeated. That is, the user may repeatedly trigger a key event "alt-j" to jump between the objects. In FIG. 9, the user makes the jump operation and jump to object 3, so the appearance of the object 3 is different from those of object 1, object 2, and object 4.

Figure 10:
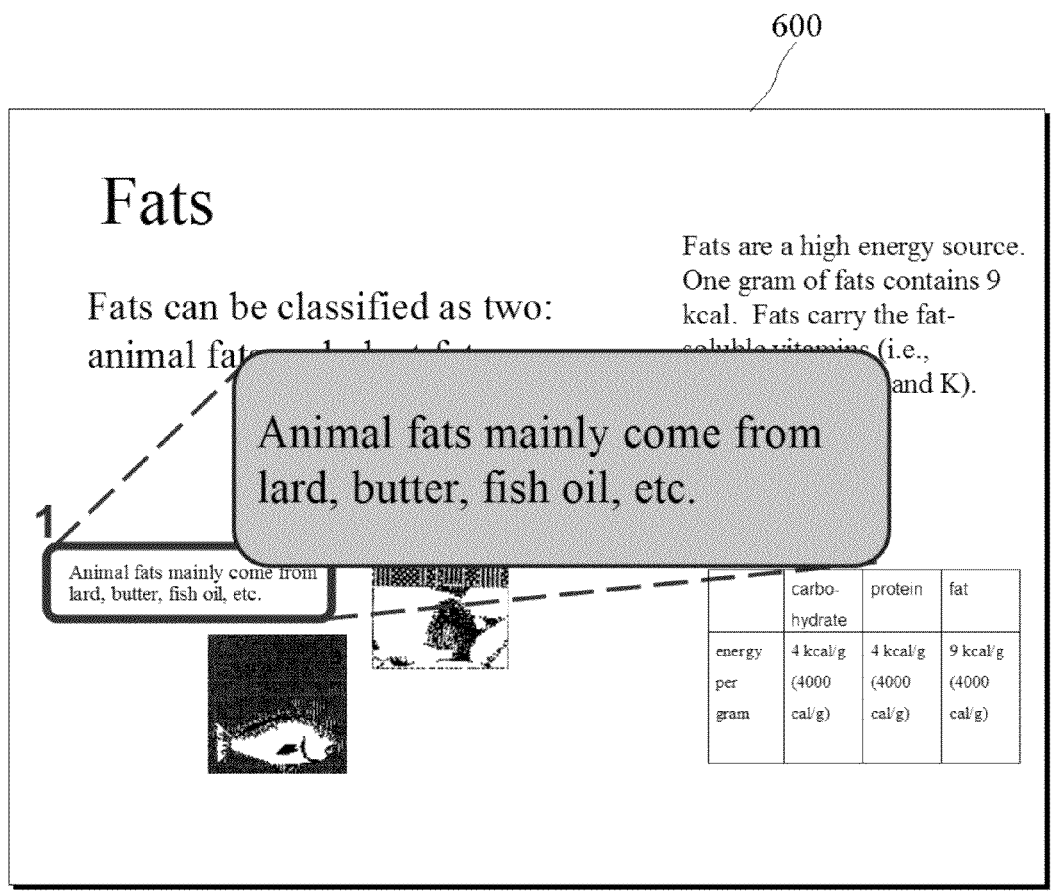
FIG. 10 shows in a screenshot an example of a document according one embodiment of the present disclosure, wherein a zoom-in operation of a text object is explained.
Figure 11:
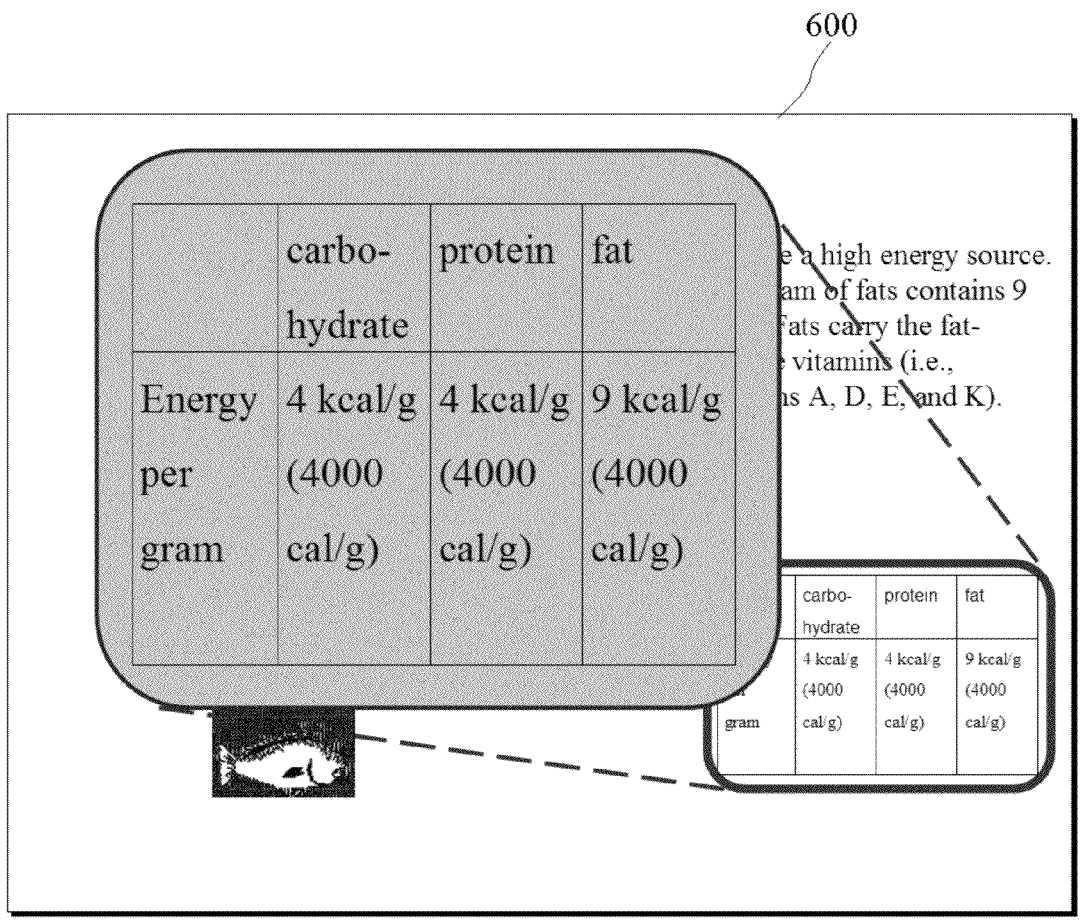
FIG. 11 shows in a screenshot an example of a document according one embodiment of the present disclosure, wherein a zoom-in operation of a table object is explained.
Figure 12:
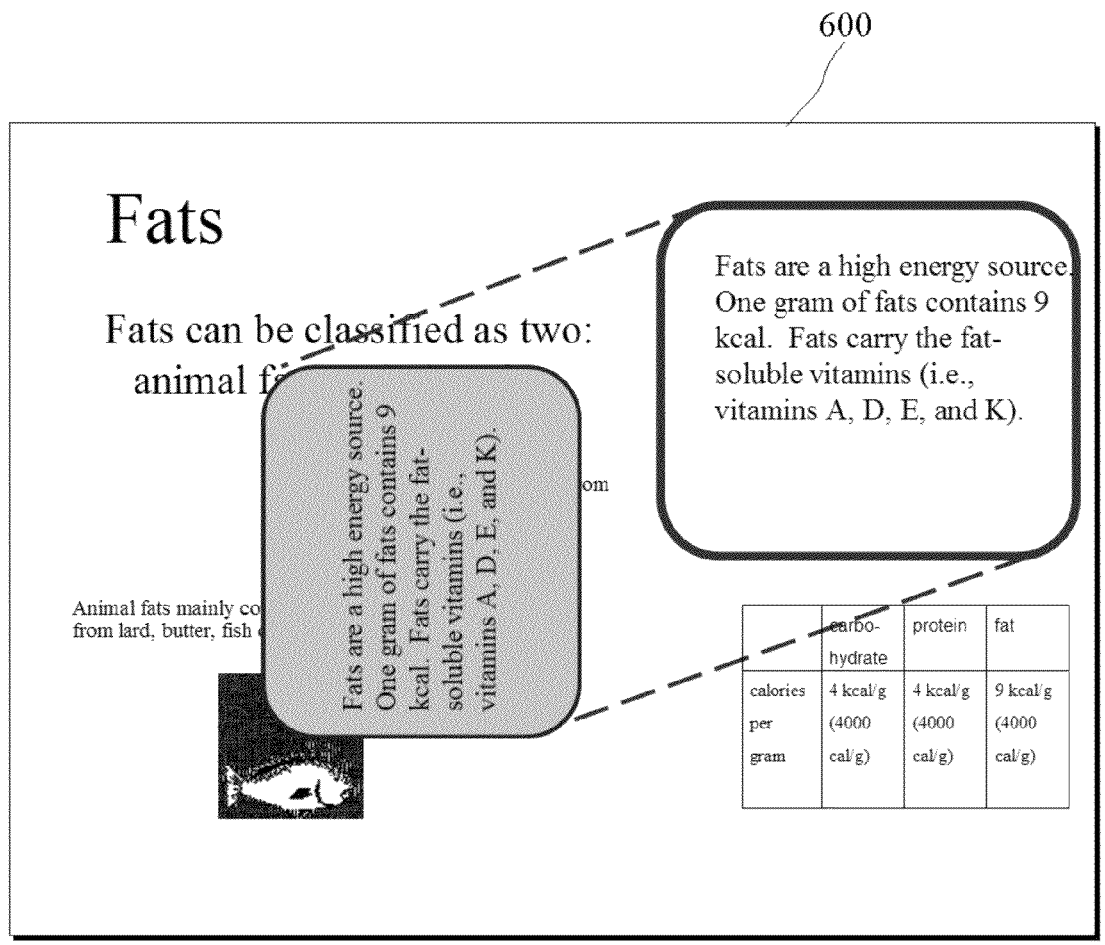
FIG. 12 shows in a screenshot an example of a document according one embodiment of the present disclosure, wherein a rotate operation of a text object is explained.

After the user jumps to a specific object, the user can further manipulate the specific object, such as rotating the object clockwisely; zooming in the object, zooming out the object, rotating the object counterclockwisely; flipping the object; displaying the object in a most appropriate manner (for example, in a fit-to-screen display manner). FIG. 10 shows in a screenshot an example of a document according one embodiment of the present disclosure, wherein a zoom-in operation of a text object is explained. For example, the user may trigger a key event of "alt-z" to achieve a zoom-in operation of the text object. FIG. 11 shows in a screenshot an example of a document according one embodiment of the present disclosure, wherein a zoom-in operation of a table object is explained. FIG. 12 shows in a screenshot an example of a document according one embodiment of the present disclosure, wherein a rotate operation of a text object is explained. For example, the user can trigger a key event of "alt-r" to achieve an operation of rotating the object counterclockwisely. Other manipulations as mentioned above are implemented in a similar way.

Figure 13:
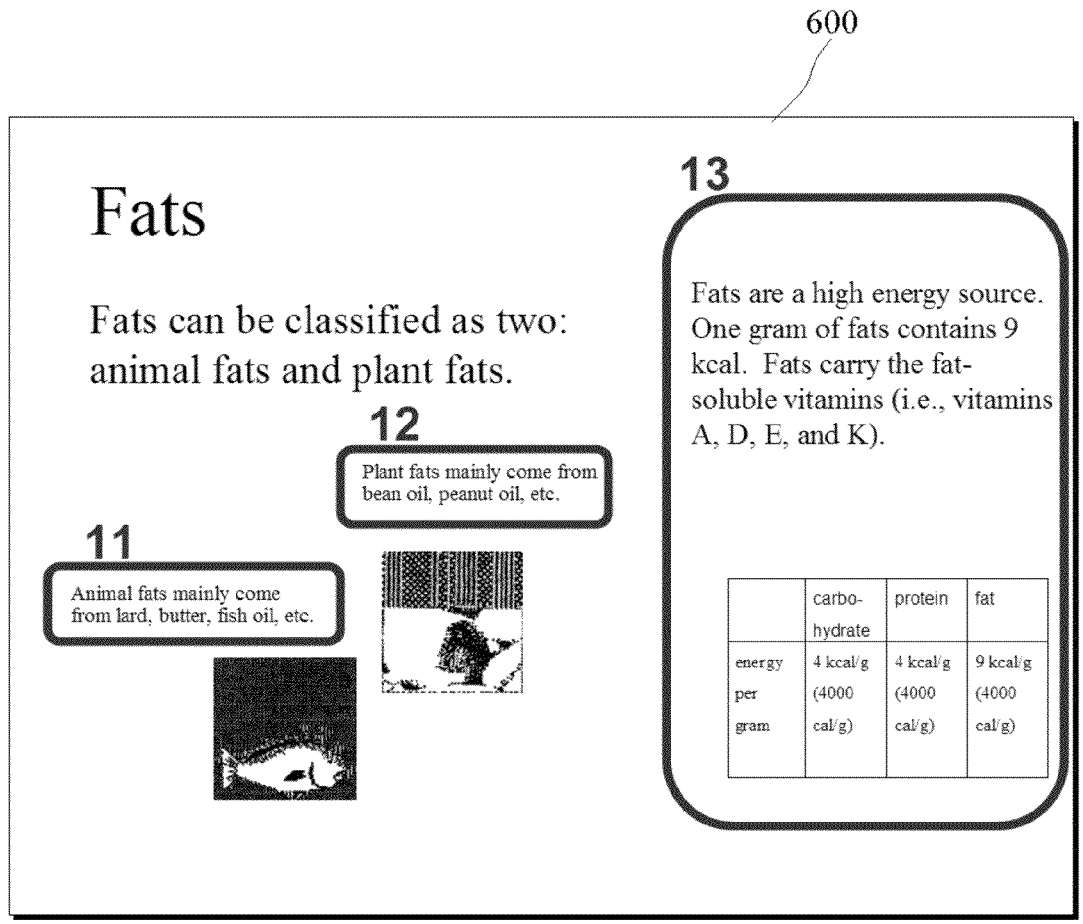
FIG. 13 shows in a screenshot an example of a document according one embodiment of the present disclosure, wherein a group of selected objects are explained.

FIG. 13 shows in a screenshot an example of a document according one embodiment of the present disclosure, wherein a group of selected objects are explained. A document author creates a document, and the document may comprise a plurality of objects, such as text objects, image objects, animation objects, video objects, and the combinations thereof. The document author can determine a group of specific objects (for example, object 1, object 2 and object 3) to be respectively manipulated/displayed according to the actual needs. Object 1 comprises a text object. Object 2 comprises a text object. Object 3 comprises a text object and a table object. In other words, each object may be, for example but not limited to a single object and a combination of the objects. The objects in the combination may be of a same kind or can of different kinds. By way of conventional selection process, such as defining an area by a pointer device and determining the subjects in the area to be a single object; or inputting a key combination to select a plurality of objects to be a single object.

As mentioned above, according to the illustrative embodiments in FIGS. 4 to 13, the document 130 is created by an authoring tool (including but not limited to Powerpoint®, Freelance®, Word®, Symphony, and so on). Since the objects are defined in the document 130, the authoring tool can automatically identify the objects in the document 130, display the objects in the authoring tool, and executes the subsequent processes.

On the other way, in one illustrative embodiment, the document 130 may be a webpage. The information handling system 110 may be mobile devices (including but not limited to PDAs, mobile phones, navigating devices, and so on) which can display the webpage on the display unit thereof, the webpage may be implemented using well-known HTML (hyper-text markup language), XHTML, Java® and similar coding techniques to implement. By identifying tags of the markup language, such as <table>, <form>, <img>, <a>, <li>, and so on, the authoring tool may automatically identify the plural objects in the document 130 and the objects may be displayed on the authoring tool. Then the subsequent process may be executed on the displayed objects. According to one illustrative embodiment, the metadata tag may be generated on the header of the webpage document. The grouping task may be processed in accordance with the metadata tag.

Please refer to FIGS. 1 and 2, in the one illustrative embodiment, the user of the information handling system 196 sends a webpage request to the webpage server 199. Those skilled in the art may understand this embodiment by taking some hypothetical scenes as examples. In response to the request, the webpage server 199 may return the requested web page to the information handling system 196, and the information handling system 196 receives the requested page. Then the received web page may be analyzed and a plurality of separated objects may be generated. After the separation task, the objects may then be grouped.

Figure 14:
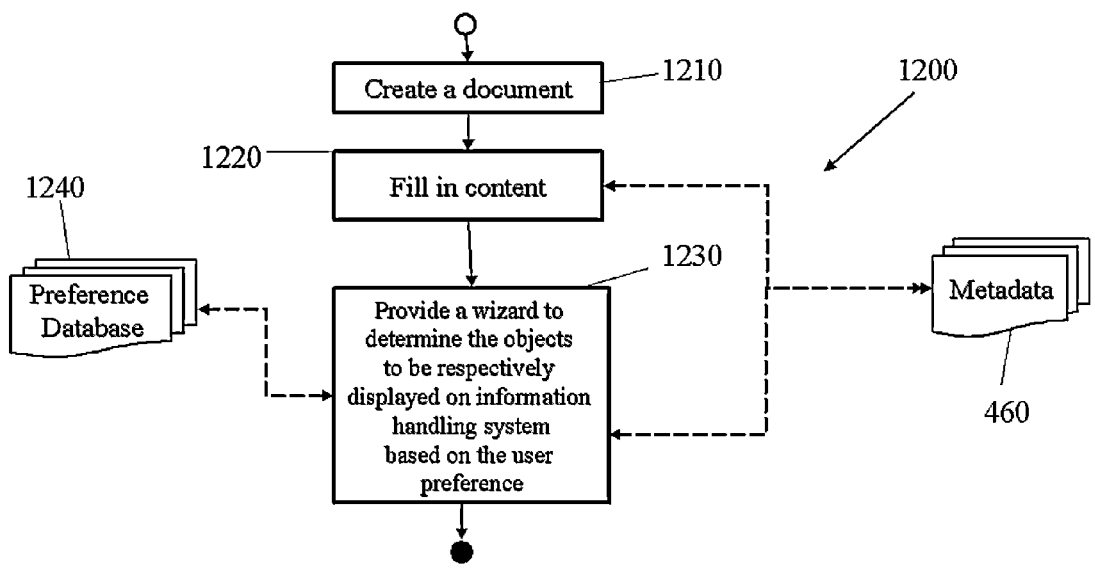
FIG. 14 is a flowchart illustrating a method according to one embodiment of the present disclosure.

FIG. 14 is a flowchart illustrating the method 400 performed in the second information handling system 110' according to one embodiment of the present invention. The method 1200 begins at step 1210, wherein an author creates the document 130. At step 420, the author may fill in content to the document 130 so that there are plural objects in the document and the plural objects may be extracted from the document 130 in the subsequent process. After the content is filled in the document 130, a wizard in the second analysis module 131 may obtain a user preference from a preference database 1240 and to determine the group of the selected objects to be respectively displayed in the information handling system 110. The jump sequence may also be determined. The related data of the above operations may be placed in a document metadata 460 or a specific area of the document 130. The wizard is, for example, a guiding assistance program to guide the user to execute a series of steps to accomplish the process through an implementation of a graphic user interface (GUI). In this embodiment, the logics in FIG. 14 can generate the above functions and interfaces, and the user can be guided to achieve the above modules and tasks through a serial of steps.

The ways of generating the user preferences may be different in accordance with different requirement. For example, according to one illustrative embodiment, the objects selected to be respectively displayed on the display unit may comprises text objects and table objects, and the image objects may not be displayed on the display unit. In one illustrative embodiment, the display sequence of the objects groups may first be the text object group, and then the table object group. In the same object group, the display sequence may be from the left portion to the right portion. Alternatively, the display sequence may be from the left portion, the middle portion, and then the right portion. Alternatively, the display sequence may be the top left portion, the middle left portion, the bottom left middle right portion, the top right portion, the middle right portion, and the bottom right portion. For each part of the portion, the display sequence may be from top to bottom. Taking FIG. 7 for example, the display sequence may be from the left portion to the right portion. In each portion, the display sequence may be from top to bottom according to one illustrative embodiment. Thus, after the document is displayed on the display unit in a full screen, which may be hard for a user to view the document 600 on the relatively small screen of the display unit. In accordance with one illustrative embodiment, the user may highlight the selected objects by triggering a key event (such a hard key event "alt-h") and jumps between the objects by repeatedly triggering a key even (such as a hard key event "alt-j"). The display sequence of the objects can respectively be: "Fats", "Fats can be classified as two: animal fats and plant fats. to right to right from left", "Plant fats mainly come from bean oil, peanut oil, etc.", "Animal fats mainly come from lard, butter, fish oil, etc.", "Fats are a high energy source. One gram of fats contains 9 kcal. Fats carry the fat-soluble vitamins (i.e., vitamins A, D, E, and K).", and the table (object 4). The user may respectively display each object and repeatedly switch between theses objects according to the above sequence.

In fact, the display sequence can be determined by a general reading flow of a reader. For example, during a general reading flow of a reader, the early appearing object has a higher priority. If the general reading flow is from left to right, and from top to bottom, the object on the top left portion may be displayed first, and the object on the bottom right portion may be displayed last.

For example, according to one illustrative embodiment, the groups to be respectively displayed on the display unit only comprises a text group and a table group, and the image group is determined not to be displayed. Regarding the display sequence, all the objects in the text group may be first displayed, then all the objects in the table group may then be displayed. In the same group, for example, in the text group, the display sequence are based on the font sizes, so the object with largest font size is first displayed and the object with smallest font size is displayed last. For the objects with the same font size, the display sequence would be from left to right, and from up to down. Thus, according to the above user preference, after the document is displayed on the display unit in full view, which is hard for a user to view the document 600 on the relatively small display screen of the display unit. In accordance with one illustrative embodiment, the user highlights the selected objects by triggering a key even (such a hard key event "alt-h") and jumps between the objects by repeatedly triggering a key even (such as a hard key event "alt-j"). The display sequence of the objects can thus be: "Fats", "Fats can be classified as two: animal fats and plant fats.", "Fats are a high energy source. One gram of fats contains 9 kcal. Fats carry the fat-soluble vitamins (i.e., vitamins A, D, E, and K).", "Plant fats mainly come from bean oil, peanut oil, etc.", "Animal fats mainly come from lard, butter, fish oil, etc.", and the table (object 4). The user may repeatedly jump between theses objects according to the above sequence.

For example, according to one illustrative embodiment, the groups to be respectively displayed on the display unit only may comprise an image group, and the display sequence of the objects in the image group may be from left to right, and from top to bottom. Thus, in the illustrative embodiment in FIG. 7, there is only one image group determined as the group of objects to be respectively displayed on the display unit and there is only one object (object 4 in FIG. 7) in the image group.

The flow diagrams depicted herein are just examples. There may be many variations to these diagrams or the steps (or operations) described therein without departing from the spirit of the present disclosure. For instance, the display sequence may be determined based further on the analysis of the document. The analysis of the document may be, for example but not limited to the following: abstracting the images and categorizing the images, categorizing the images based on specific purposes, abstracting main sentences from the text to judge the importance of the text objects. Furtherer, there are many ways to determine the display sequence. For example, determining the display sequence based on the image areas (the larger the image area, the higher the display priority).

The grouping task according to one illustrative embodiment can be used to select the object groups and the display sequence. The objects to be respectively displayed on the display unit may be of the same type (such as only image objects or only text objects). The objects to be respectively displayed on the display unit may be of a combination of different types. The objects to be respectively displayed on the display unit may be determined by the document author. The display sequence may be a sequence resulting from an analysis. The display sequence may be determined by the document author. The display sequence may be a sequence resulting from a combination of the above methods.

Figure 15:
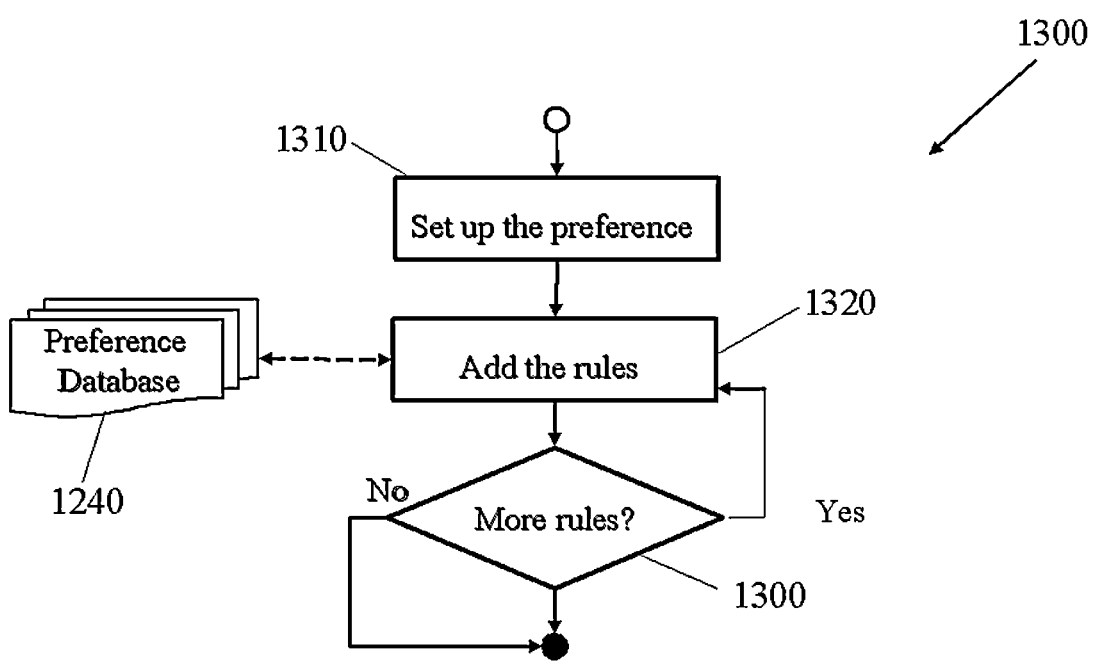
FIG. 15 is a flowchart illustrating a method according to one embodiment of the present disclosure.

FIG. 15 is a flowchart illustrating a method 1300 of setting up rules based on the document features, performed in the second information handling system 110' according to one embodiment of the present disclosure. The method 1300 begins at step 1310, wherein the author setup a preference. At step 1320, the author adds the rules into the preference database 1240. At step 1330, the document author determines whether more rules are to be added. If yes, the method 130 goes to step 1320 and repeats.

Figure 16:
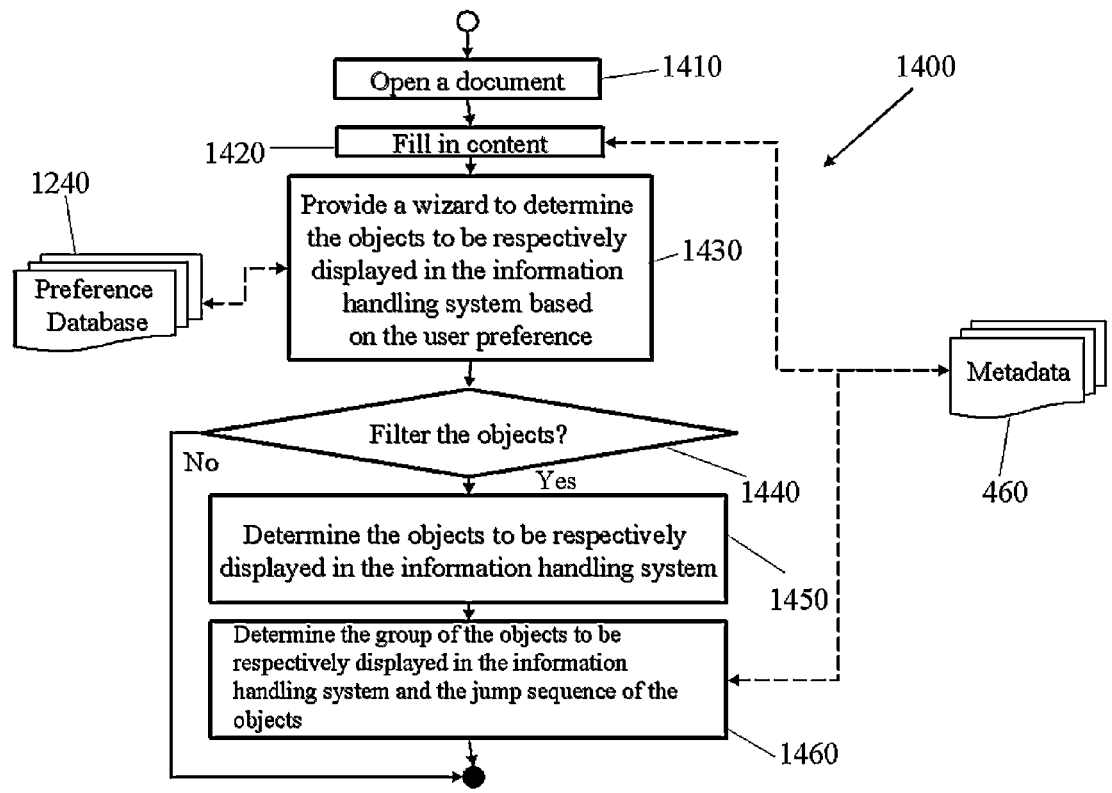
FIG. 16 is a flowchart illustrating a method according to one embodiment of the present disclosure.

FIG. 16 is a flowchart illustrating the method 1400 performed in the information handling system 110 according to one embodiment of the present invention. The method 1400 begins at step 1410, wherein an author creates the document 130. At step 1420, the author fills in content to the document 130 so that there are plural objects (such as text objects, table objects, image objects, animation objects, video objects, and so on) in the document 130. After the content is filled in the document 130, a wizard in the second analysis module 131 obtains a user preference to judge the objects to be respectively displayed on the display unit of the information handling system 110 from a preference database 1240, wherein the display sequence may also be determined. The wizard may be, for example, a guiding assistance program to guide the user to execute s series of steps to accomplish the process through an implementation of a graphic user interface (GUI). In this embodiment, the logics in FIG. 16 can generate the above functions and interfaces, and the user can be guided to achieve the above modules and tasks through a serial of steps. At step 1440, after the objects determined by the wizard, the document author may determine whether a filter operation is executed on them. If yes, the document author filters the objects selected by the wizard (step 1450). At step 1460, the grouping module 132 determines the group of the objects to be respectively displayed in the information handling system 110 and the jump sequence of the objects. All the related data of the steps are located on the metadata 460 of the document 130 or a specific area of the document 130. Similarly to the previous embodiments, the criteria of the objects to be respectively displayed in the information handling system 110 depend on different situations or requirements.

In accordance with the illustrative embodiments of the present invention, the experience in displaying/viewing a document on a mobile device is improved and satisfactory. On the other way, optimization for displaying/viewing a document on different mobile device can be achieved. The implementation may require only a definition of the view group when creating the document. The operation and advantage is achieved by the application itself, no additional components may be required, little or no additional storage for storing the re-authored documents may be required, and a smaller footprint may be occupied.

The description shown above is only about the embodiments of the present disclosure and is not intended to limit the scope of the disclosure. Any equivalent variations or modifications without departing from the spirit disclosed by the present disclosure should be included in the appended claims.

What is claimed is:

1. A method for displaying a document on an information handling system having a display unit and an input unit, comprising:
receiving a group of selected objects of said document from a user to be displayed on said display unit;
identifying all objects of said group of selected objects belonging to a first type group;
identifying all objects of said group of selected objects belonging to a second type group;
identifying a first object of said group of selected objects belonging to said first type group based upon, at least in part, identifying markup language tags associated with said first object belonging to said first type grow;
receiving a display sequence of said group of selected objects of said document from said user;
generating object views respectively corresponding to said group of selected objects and said display sequence, wherein each object view corresponds to a single object of said group of selected objects;
displaying said object views on said display unit by manipulating said input unit;
displaying said object views in accordance with a predefined preference in response to a user operation, wherein said predefined preference is stored within a preference database;
wherein said user operation comprises:
a first key activation for highlighting said object views on said display unit, wherein said first key activation includes at least one of a hardware key activation and a software key activation;
a second key activation for jumping between object views on said display unit, wherein said second key activation includes at least one of a hardware key activation and a software key activation; and
a third key activation for a control of said object views on said display unit in response to said user operation, wherein said control includes at least one of a zoom-in operation, a zoom-out operation, a rotate operation, a flip operation, and a fit-to-screen operation, wherein said third key activation includes at least one of a hardware key activation and a software key activation; and
automatically displaying all objects of said group of selected objects belonging to said first type group prior to displaying an object of said group of selected objects belonging to said second type group, based upon said display sequence of at least one type of group and a display sequence of objects in each type group as specified within said predefined preference.

2. The method of claim 1, further comprising:
generating a document view of said document on said display unit in response to a request to display said document on said display unit.

3. The method of claim 1, further comprising:
providing a plurality of objects associated with said document;
providing said group of selected objects selected from said plurality of objects associated with said document; and
providing said predefined preference associated with said object views corresponding to said group of selected objects.

4. The method of claim 3, wherein said predefined preference comprises a display sequence of said object views on said display unit.

5. The method of claim 4, wherein said group of selected objects are categorized as at least one type group, and wherein said at least one type group comprises a text group, a table group, an image group, an animation group, a video group, or a combination thereof.

6. The method of claim 1, wherein said information handling system comprises a mobile device, and wherein said mobile device is selected from a group consisting of a PDA, a mobile phone, a smart phone, and a navigating device.

7. An information handling system, said information handling system having a display unit and an input unit, for displaying a document on said display unit, comprising:
- a processor;
- a memory module couple with said processor;
- an analysis module executable by said processor and said memory module, wherein said analysis module is configured to:
  - receive a group of selected objects of said document from a user to be displayed on said display unit;
  - identify all objects of said group of selected objects belonging to a first type group;
  - identify all objects of said group of selected objects belonging to a second type group;
  - identify a first object of said group of selected objects belonging to said first type group based upon, at least in part, identifying markup language tags associated with said first object belonging to said first type group;
  - receive a display sequence of said group of selected objects of said document from said user;
- a view generation module executable by said processor and said memory module, wherein said view generation module is configured to generate object views respectively corresponding to said group of selected objects and said display sequence, wherein each object view corresponds to a single object of said group of selected objects; and
- a manipulation module executable by said processor and said memory module, wherein said manipulation module is configured to manipulate said object views displayed on said display unit;
- wherein said object views are displayed in accordance with a predefined preference in response to a user operation wherein said predefined preference is stored within a preference database;
- wherein said user operation comprises:
  - a first key activation for highlighting said object views on said display unit, wherein said first key activation includes at least one of a hardware key activation and a software key activation;
  - a second key activation for jumping between object views on said display unit, wherein said second key activation includes at least one of a hardware key activation and a software key activation; and
  - a third key activation for a control of said object views on said display unit in response to said user operation, wherein said control includes at least one of a zoom-in operation, a zoom-out operation, a rotate operation, a flip operation, and a fit-to-screen operation, wherein said third key activation includes at least one of a hardware key activation and a software key activation; and
- wherein all objects of said group of selected objects belonging to said first type group are automatically displayed prior to displaying an object of said group of selected objects belonging to said second type group, based upon said display sequence of at least one type of group and a display sequence of objects in each type group as specified within said predefined preference.

8. The system of claim 7, wherein said view generation module further generates a document view of said document on said display unit in response to a request to display said document on said display unit.

9. The system of claim 7, further comprising a receiver module executable by said processor and said memory module, wherein said receiver module is configured to provides:
- a plurality of objects associated with said document;
- said group of selected objects selected from said plurality of objects associated with said document;
- said predefined preference associated with said object views corresponding to said group of selected objects.

10. The system of claim 9, wherein said predefined preference comprises a display sequence of said object views on said display unit.

11. The system of claim 10, wherein said group of selected objects are categorized as at least one type group, wherein said at least one type group comprises a text group, a table group, an image group, an animation group, a video group, or a combination thereof.

12. The system of claim 7, wherein said information handling system comprises a mobile device, and wherein said mobile device is selected from a group consisting of a PDA, a mobile phone, a smart phone, and a navigating device.

13. A computer program product for displaying a document on an information handling system having a display unit and an input unit, said computer program product residing on a non-transitory computer readable medium having a plurality of instructions stored thereon, which when executed by a processor, cause said processor to perform operations comprising:
- receiving a group of selected objects of said document from a user to be displayed on said display unit;
- identifying all objects of said group of selected objects belonging to a first type group;
- identifying all objects of said group of selected objects belonging to a second type group;
- identifying a first object of said group of selected objects belonging to said first type group based upon, at least in part, identifying markup language tags associated with said first object belonging to said first type group;
- receiving a display sequence of said group of selected objects of said document from said user;
- generating object views respectively corresponding to said group of selected objects and said display sequence, wherein each object view corresponds to a single object of said group of selected objects;
- displaying said object views on said display unit by manipulating said input unit;
- wherein said object views are displayed in accordance with a predefined preference in response to a user operation, wherein said predefined preference is stored within a preference database;
- wherein said user operation comprises:
  - a first key activation for highlighting said object views on said display unit, wherein said first key activation includes at least one of a hardware key activation and a software key activation;
  - a second key activation for jumping between object views on said display unit, wherein said second key activation includes at least one of a hardware key activation and a software key activation; and
  - a third key activation for a control of said object views on said display unit in response to said user operation, wherein said control includes at least one of a zoom-in operation, a zoom-out operation, a rotate operation, a flip operation, and a fit-to-screen operation, wherein said third key activation includes at least one of a hardware key activation and a software key activation; and
- automatically displaying all objects of said group of selected objects belonging to said first type group prior to displaying an object of said group of selected objects belonging to said second type group, based upon said display sequence of at least one type of group and a display sequence of objects in each type group as specified within said predefined preference.

* * * * *